United States Patent
Duddey

[15] 3,664,984
[45] May 23, 1972

[54] CATIONIC DYEABLE POLYESTER MODIFIED WITH ALKOXY BENZENE SULFONIC ACIDS

[72] Inventor: James E. Duddey, Akron, Ohio
[73] Assignee: The Goodyear Tire & Rubber Company, Akron, Ohio
[22] Filed: Oct. 2, 1969
[21] Appl. No.: 863,342

[52] U.S. Cl. ................260/22 D, 8/55, 260/22 T, 260/49
[51] Int. Cl. ..........................C08g 17/14, C08g 17/16
[58] Field of Search ........................260/75 S, 49, 22

[56] References Cited

UNITED STATES PATENTS

| | | | |
|---|---|---|---|
| 3,004,006 | 10/1961 | King et al. | 260/79.3 |
| 3,033,824 | 5/1962 | Huffman | 260/75 |
| 3,238,180 | 3/1966 | Wiloth | 260/47 |

*Primary Examiner*—William H. Short
*Assistant Examiner*—L. L. Lee
*Attorney*—F. W. Brunner and H. A. Pattison, Jr.

[57] ABSTRACT

Polyesters are rendered more acceptable to basic dyes by adding to the polyester either during or after polycondensation certain metal, ammonium, or amine salts of alkoxy benzene sulfonic acids.

17 Claims, No Drawings

CATIONIC DYEABLE POLYESTER MODIFIED WITH ALKOXY BENZENE SULFONIC ACIDS

This invention relates to fibers and fabrics of polyalkylene terephthalates and copolyesters containing the terephthalate group such as copolyesters of a dihydric alcohol, terephthalic acid and a dimer acid (see U.S. Pat. No. 3,390,108 to Keck et al) copolyesters of ethylene terephthalate and ethylene isophthalate (see U.S. Pat. No. 2,965,613 to Milone et al) and other copolyesters hereinafter mentioned. More particularly the present invention relates to improving the cationic dyeability of polyesters by adding thereto either during or after polycondensation, certain metal, ammonium or amine salts of alkoxy benzene sulfonic acids.

The polyesters useful in accordance with the present invention are cold-drawing, linear, highly polymerized esters of terephthalic acid and glycols of the formula $HO(CH_2)_nOH$, where $n$ is an integer of from 2 to 10. The copolyesters used in this invention may comprise ethylene terephthalate-ethylene isophthalate copolyesters as described in U.S. Pat. No. 2,965,613 to Milone et al.

In producing polyalkylene terephthalates there is involved the interaction of at least two molecular proportions of a glycol (preferably ethylene glycol) per molecular proportion of terephthalic acid with the splitting out of water. Subsequent heating of the resulting glycol ester of terephthalic acid at about 250° to 260° C. under 0.05 to 20 millimeters of mercury absolute pressure results in the production of high polymer with the splitting out of glycol which is removed from the reaction mixture.

Alternatively, highly polymeric polyalkylene terephthalates may be produced by heating terephthalic acid bodies, such as ester-forming derivatives of terephthalic acid with at least one glycol. Suitable ester forming derivatives are aliphatic or aromatic esters of terephthalic acid such as $C_1$ to $C_4$ alkyl esters and/or aryl esters such as those from phenol, cresols and the like. The preferred derivatives are methyl and ethyl terephthalates.

In this latter alternative procedure first there is a transesterification reaction (or ester interchange reaction) to low polymer with the evolution of alcohol. Subsequently, upon heating at about 250° to 260° C. under 0.05 to 20 millimeters of mercury absolute pressure there is a polycondensation reaction to high polymer with splitting out (and removal) of glycol. Each reaction is preferably catalyzed. Zinc diacetate and other known catalysts are employed to speed up the transesterification reaction and antimony oxide or other known catalysts are employed to promote the subsequent polycondensation reaction.

The preparation of ethylene terephthalate-ethylene isophthalate copolyesters is along lines previously described and is described in detail in U.S. Pat. No. 2,965,613 (supra).

Other linear aromatic polyester resins useful for the purposes of the invention include among others not only polyethylene terephthalate and copolyesters of ethylene terephthalate and ethylene isophthalate, but also such polymers as those of cyclohexane dimethylol terephthalate, polyethylene-2,6-naphthalate and copolyesters of terephthalic acid which contain at least 75 mol percent of terephthalic acid.

In accordance with the invention polyesters are treated by contact either during or after polycondensation with about 0.1 to 25 weight percent, based on total weight of the composition, of a salt of an alkoxy benzene sulfonic acid at about 240° to 290° C. for about 10 to 120 minutes or more. The salts of alkoxy benzene sulfonic acids included within the purview of the invention may be illustrated by the following formulas:

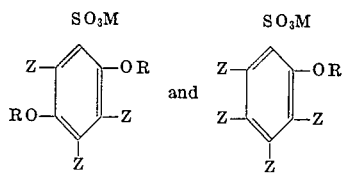

wherein M is a constituent selected from the group consisting of alkali metals, alkaline earth metals, ammonium and $C_2$ to $C_{10}$ alkyl amines, R is an alkyl group of one to 15 carbon atoms or alkyl terminated polyether, and Z is selected from the group consisting of hydrogen, halogen, hydroxy and $C_1$ to $C_{15}$ alkyl groups.

Typical alkali metal, alkaline earth metal, ammonium and amine salts are of the following sulfonic acids:
a. 2-alkoxy-3,5-dihalo benzene sulfonic acid
b. 2-alkoxy-5-alkylbenzene sulfonic acid
c. 2-alkoxy-5-halobenzene sulfonic acid
d. 2-alkoxy-2,4,5-trihalobenzene sulfonic acid
e. 2-alkoxy-4,5-dimethylbenzene sulfonic acid
f. 2-alkoxybenzene sulfonic acid
g. 2-methoxy,5-ethoxy benzene sulfonic acid
h. 2,5-dialkoxy benzene sulfonic acid Typical cationic (basic) dyestuffs suitable for the purposes of the invention include, among others, Sevron Blue BGL (Basic Blue 35), Sevron Brilliant Red 35 (Basic Violet 15), Sevron Yellow 3RL (Basic Yellow 15), Sandocryl Blue B–36 (Basic Blue 3), Sandocryl Red B–3B (Basic Red 15), Sandocryl Yellow B4RL (Basic Yellow 32), Chrysodine C R (conc) (Basic Orange 1), Amacryl Brilliant Red 4G (Basic Red 14), Victoria Blue B (Basic Blue 26), and the like.

In order to more fully illustrate the invention the following experimental data are given.

EXAMPLE 1

1. Sodium 2,5-dibutoxybenzenesulfonic acid was prepared according to the method J. R. Gallent (J. Org. Chem., 23, 75 (1958).

2. Bis-hydroxyethyl terephthalate was prepared by reacting 0.25 mol of dimethyl terephthalate with 0.55 mol ethylene glycol in the presence of Zn Ac₂·2 H₂O catalyst. Sodium 2,5-dibutoxy-benzenesulfonic acid (4.05 g, 0.0125 mol) and antimony trioxide (0.015 g) were added to the product from the previous reaction. The polymerization was carried out at 280° C. and 0.5 mm Hg for one hour. The product was a homogeneous, white, crystalline and fiber forming material.

3. Hand drawn fibers from the polymer described in Example 2 were dyed with Rhodamine B. The fibers dyed.

4. The polymer was prepared in one pound quantities. The polymer obtained has the properties shown in Table I.

TABLE I

| Properties of Polymer | |
| --- | --- |
| IV | 0.453 |
| COOH eq/10⁶ g | 11 |
| Differential thermal analysis M.P. | 254° C. |

5. The polymer obtained in run 4 was dried at 130° C. in vacuo and spun with the 1 inch extruder to give homogeneous white fibers which had the following properties as shown in Table II.

TABLE II

| Fiber Properties | |
| --- | --- |
| Denier | 94 |
| Tenacity, g/denier | 2.4 |
| Elongation, % | 19 |

6. The fiber obtained in run 5 was dyed with basic dyes, Rhodamine B and Basic Green 4 and carrier to medium shades.

EXAMPLE 2

THE ADDITION OF THE SULFONATE SALT AT THE END OF POLYCONDENSATION

Bis-(beta-hydroxyethyl) terephthalate was prepared by reacting 0.25 mol of dimethyl terephthalate with 0.55 mol ethylene glycol in the presence of 0.015 g $Zn(OAc)_2 \cdot 2H_2O$ catalyst. Azelaic acid (0.005 mol) and 0.0015 g antimony trioxide catalyst were added and the mixture was polymerized at 280° C. and 0.5 mm Hg for 1 hour. The vacuum was released and 4.05 g (0.0125 mol) of sodium 2,5-dibutoxybenzenesulfonate added. The mixture was stirred for 10 minutes and then sampled. The product was homogeneous and fiber forming.

Resort may be had to modifications and variations of the disclosed embodiments without departing from the spirit of the invention or the scope of the appended claims.

What is claimed is:

1. A polyester selected from the group consisting of polyethylene terephthalate, polycyclohexane dimethylol terephthalate, polyethylene 2,6-naphthalate and copolyesters of terephthalic acid which contain at least 75 mol percent of terephthalic acid of improved acceptance to basic dyes, said polyester having been reacted after polycondensation with about 0.1 to 25 weight percent based on total weight of the composition of a salt of an alkoxy benzene sulfonic acid at about 240° to 290° C. for about 10 to 120 minutes, said salt being of the formulae:

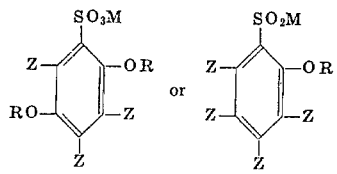

wherein M is selected from the group consisting of alkali metals, alkaline earth metals, ammonium and $C_2$ to $C_{10}$ alkyl amines, R is selected from the group consisting of alkyl groups of about one to 15 carbon atoms and Z is selected from the group consisting of hydrogen, halogen, and $C_1$ to $C_{15}$ alkyl groups.

2. The polyester of claim 1 in which the polymer is polyethylene terephthalate.

3. The polyester of claim 1 in which the polymer is a copolyester of ethylene terephthalate and ethylene isophthalate.

4. The polyester of claim 1 in which the polymer is a copolyester of at least one glycol, terephthalic acid and a dimer acid.

5. The polyester of claim 1 in which the polymer is poly(1,4-cyclohexane dimethylene) terephthalate.

6. The polyester of claim 1 in the form of a fiber.

7. The polyester of claim 1 in the form of a film.

8. The polyester of claim 1 in which the salt is sodium butoxy benzene sulfonic acid.

9. The polyester of claim 1 in which the salt is sodium 2,5-dibutoxy benzene sulfonate.

10. A process for the preparation of a polyester selected from the group consisting of polyethylene terephthalate, polycyclohexane dimethylol terephthalate, polyethylene 2,6-naphthalate and copolyesters of terephthalic acid which contain at least 75 mol percent of terephthalic acid of improved acceptance to basic dyes which comprises reacting said polyester with about 0.1 to 25 weight percent, based on total weight of the composition, of a salt of an alkoxy benzene sulfonic acid at about 240° to 290° C. for about 10 to 120 minutes, said salt being of the formulae:

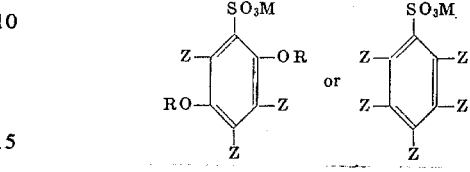

wherein M is selected from the group consisting of alkali metals, alkaline earth metals, ammonium and $C_2$ to $C_{10}$ alkyl amines, R is selected from the group consisting of alkyl groups of about one to 15 carbon atoms, and Z is selected from the group consisting of hydrogen, halogen, and $C_1$ to $C_{15}$ alkyl groups.

11. A process in accordance with claim 10 in which the polyester is polyethylene terephthalate.

12. A process in accordance with claim 10 in which the polyester is a copolyester of ethylene terephthalate and ethylene isophthalate.

13. The process of claim 10 in which the polyester is a copolyester of at least one glycol, terephthalic acid and a dimer acid.

14. A process in accordance with claim 10 in which the polyester is poly(1,4-cyclohexane dimethylene) terephthalate.

15. A process in accordance with claim 10 in which the salt is sodium 2,5-dibutoxy benzene sulfonic acid.

16. A process in accordance with claim 10 in which the salt is sodium dibutoxy benzene sulfonate.

17. A polyester of improved acceptance to basic dyes, said polyester being selected from the group consisting of polyethylene terephthalate, polycyclohexane dimethylol terephthalate, polyethylene 2,6-naphthalate and copolyesters of terephthalic acid which contain at least 75 mol percent of terephthalic acid and having been reacted during polycondensation with about 0.1 to 25 weight percent based on total weight of the composition of a salt of an alkoxy benzene sulfonic acid at about 240° to 290° C. for about 10 to 120 minutes, said salt being of the formulae

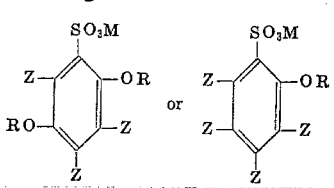

wherein M is selected from the group consisting of alkali metals, alkaline earth metals, ammonium and $C_2$ to $C_{10}$ alkyl amines, R is selected from the group consisting of alkyl groups of about one to 15 carbon atoms, and Z is selected from the group consisting of hydrogen, halogen, and $C_1$ to $C_{15}$ alkyl groups.

* * * * *